United States Patent [19]

Friedrich

[11] Patent Number: 4,718,301
[45] Date of Patent: Jan. 12, 1988

[54] DRIVING MECHANISM FOR MOTOR VEHICLES HAVING AT LEAST TWO LIVE AXLES

[75] Inventor: Karl Friedrich, Leibnitz, Austria

[73] Assignee: Steyr-Daimler-Puch Aktiengesellschaft, Vienna, Austria

[21] Appl. No.: 842,907

[22] Filed: Mar. 24, 1986

[30] Foreign Application Priority Data

Apr. 2, 1985 [AT] Austria ................................ 981/85

[51] Int. Cl.⁴ .......................................... F16H 37/06
[52] U.S. Cl. ...................................... 74/705; 74/710; 74/665 GC
[58] Field of Search ................. 74/705, 694, 695, 700, 74/710, 785, 665 F, 665 GC, 665 T, 750 R, 740; 180/244, 245, 246, 247

[56] References Cited

U.S. PATENT DOCUMENTS

| | | | |
|---|---|---|---|
| 2,464,890 | 3/1949 | Premo | 74/750 R |
| 3,090,256 | 5/1963 | Hause | 74/695 |
| 3,370,486 | 2/1968 | Lamburn | 74/695 |
| 4,357,840 | 11/1982 | Winzeler | 74/705 |
| 4,541,503 | 9/1985 | Akutagawa et al. | 180/247 |
| 4,562,897 | 1/1986 | Renneker | 74/700 |
| 4,572,318 | 2/1986 | Cady | 74/705 |
| 4,605,087 | 8/1986 | Ashauer et al. | 180/244 |

FOREIGN PATENT DOCUMENTS 887849 1/1962 United Kingdom .

*Primary Examiner*—Lawrence Staab
*Assistant Examiner*—David Novais
*Attorney, Agent, or Firm*—Kurt Kelman

[57] ABSTRACT

A motor vehicle having at least two live axles is driven by an engine having an output shaft which is transverse to the direction of travel of the vehicle. That engine is succeeded by a change-speed transmission having shafts which are parallel to the output shaft of the engine. The change-speed transmission drives one live axle via a spur gear train and drives the second live axle via a first angle drive that is operatively connected to the spur gear drive, a second angle drive that is operatively connected to the second live axle, and a universal-joint shaft interconnected between the first and second angle drives. To permit the input shaft of the first angle drive to be arranged as close as possible to the change-speed transmission without an increase of the driving pinion of the second angle drive in diameter, a planetary gear train is interconnected between the first angle drive and the universal-joint shaft.

6 Claims, 2 Drawing Figures

DRIVING MECHANISM FOR MOTOR VEHICLES HAVING AT LEAST TWO LIVE AXLES

BACKGROUND OF THE INVENTION

1. Field of the Invention

This invention relates to a driving mechanism for motor vehicles having at least two live axles, which driving mechanism comprises an engine having a shaft which extends transversely to the direction of travel, a change-speed transmission having shafts which are parallel to the engine shaft and adapted to drive one live axle via a spur gear train, and as means for driving the other live axle a first angle drive, which is operatively connected to the spur gear train, a second angle drive operatively connected to the second live axle, and a universal-joint shaft inter-connected between said first and second angle drives.

2. Description of the Prior Art

British Patent Specification No. 887,849 describes a driving mechanism of that kind, in which the distance from the axis of the driven gear of the spur gear train and the driving bevel gear of the first angle drive to the gear-box of the spur gear change-speed transmission is relatively large so that the driving bevel gear of the first angle drive has a large radius and the driving pinion of the second angle drive is relatively small. This is due to the fact that the transmission ratio determined by the driving gear of the first angle drive and its driven gear must be inverse to the transmission ratio determined by the driving pinion and the driven gear of the second angle drive so that the two live axles will rotate at the same speed. For design reasons it it not always possible to provide the axis of the driven gear of the spur gear train and the driving bevel gear of the first angle drive at a large distance from the housing of the change-speed transmission and in such case the driving bevel gear of the first angle drive must be relatively small in diameter so that the diameter of the driving bevel gear of the second angle drive must be increased although this is not desirable because it is desired to provide the second angle gear with a pinion which is relatively small in diameter.

SUMMARY OF THE INVENTION

It is an object of the invention to avoid that disadvantage and to provide a driving mechanism which is of the kind described first hereinbefore and in which the axis of the driven gear of the spur gear train and of the driving gear of the first bevel gear train can be arranged close to the housing of the change-speed transmission whereas the pinion of the second angle drive need not be increased in diameter. The entire driving mechanism should constitute a compact arrangement.

This object is accomplished in accordance with the invention by a planetary gear train interconnecting between the first angle drive and the universal-joint shaft.

This planetary gear train between the first and second angle drives provides a transmission stage which permits the first and second angle drives to be designed for different transmission ratios. This means that the driving bevel gear of the first angle drive may be reduced in diameter without an increase of the radius of the driving pinion of the second angle drive. Compared to a different transmission, the planetary gear train affords the further advantage that its input and output shafts are coaxial and that all elements of the gear train lie in one plane so that the planetary gear train occupies only a small space in the axial direction of the universal-joint shaft.

A particularly desirable design will be obtained if the planet carrier of the planetary gear train is directly secured to the driven bevel gear of the first angle drive, the internal gear of the planetary gear train is non-rotatably connected to the common housing which contains the first angle drive and the planetary gear train, and the sun gear of the planetary gear train is coupled to the universal-joint shaft. In such an arrangement the planetary gear train and the angle drive are accommodated in a common housing and very close to each other.

It will also be desirable to provide a viscous clutch, which directly succeeds the planetary gear train and includes a clutch housing rotatably mounted in the planet carrier of the planetary gear train and carrying a first set of coupling discs whereas a second set of coupling discs of said clutch are carried by an inner clutch member, which protrudes into said clutch housing and is coupled to the sun gear. Such a viscous clutch constitutes an automatic clutch coupling the universal joint-shaft to the sun gear of the planetary gear train in responese to the occurrence of a speed difference between said universal-joint shaft and said sun gear, i.e., between the two live axles. The torque transmitted by the clutch will increase with that speed difference. Virtually no torque will be transmitted by said clutch when a synchronism has been achieved.

It is known to provide a motor vehicle having two live axles with a viscous clutch in the power train for driving one live axle. But that known arrangement does not comprise an additional planetary gear train and does not provide a direct connection between said clutch and the first angle drive.

The assembly and disassembly of the driving mechanism will be facilitated if the common housing which accommodates the first angle drive and the planetary gear train comprises a cover, in which the planet carrier is rotatably mounted and which constitutes a partition facing the clutch housing of the viscous clutch.

The dimension in the direction of the travel can be further reduced if the clutch housing of the viscous clutch, which housing carries the first set of coupling discs, comprises a flange for connection to the universal-joint shaft.

DETAILED DESCRIPTION OF THE PREFERRED EMBODIMENT

Figure 1:
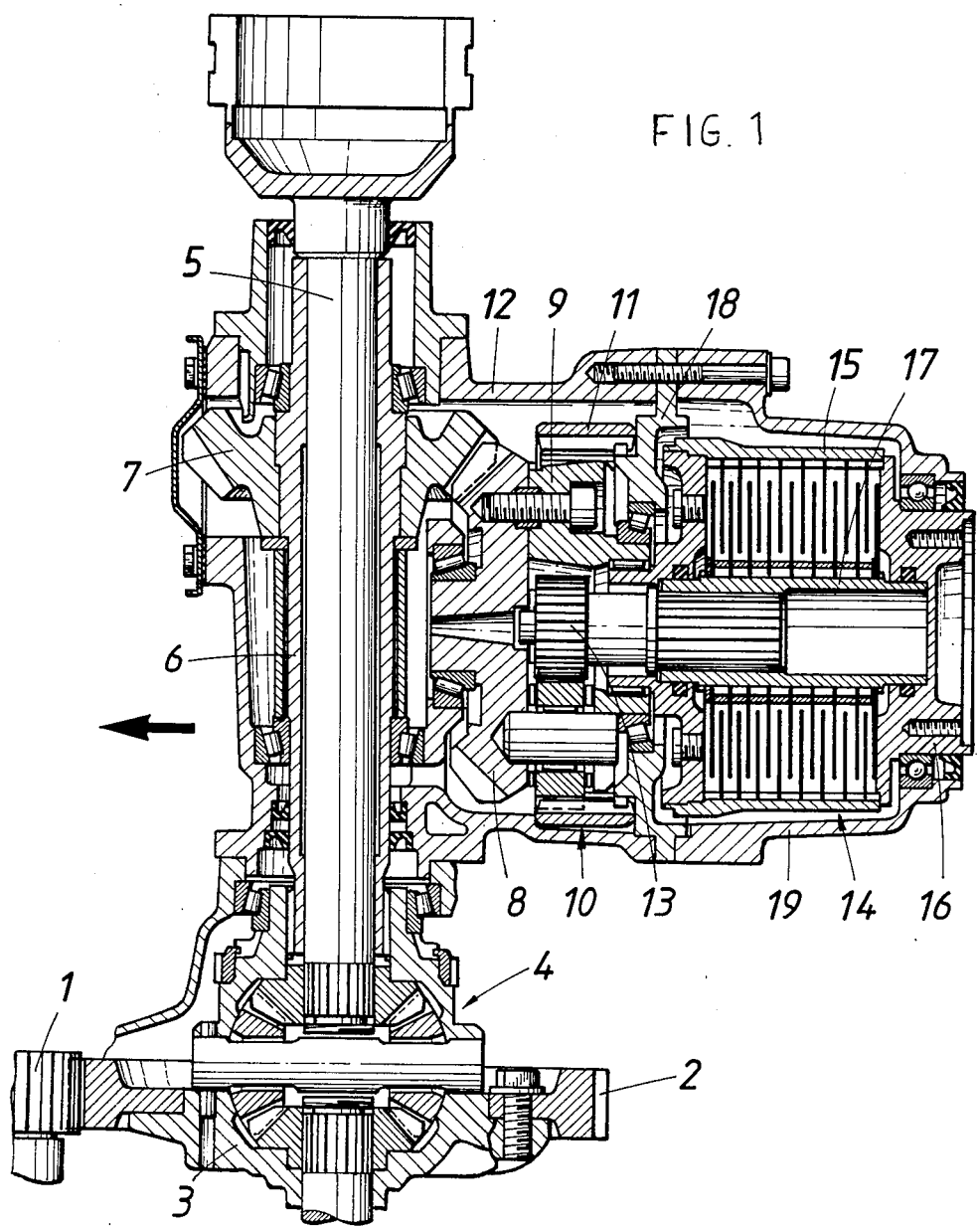
FIG. 1 is a sectional view showing by way of example a driving mechanism for a motor vehicle having at least two live axles.
Figure 2:
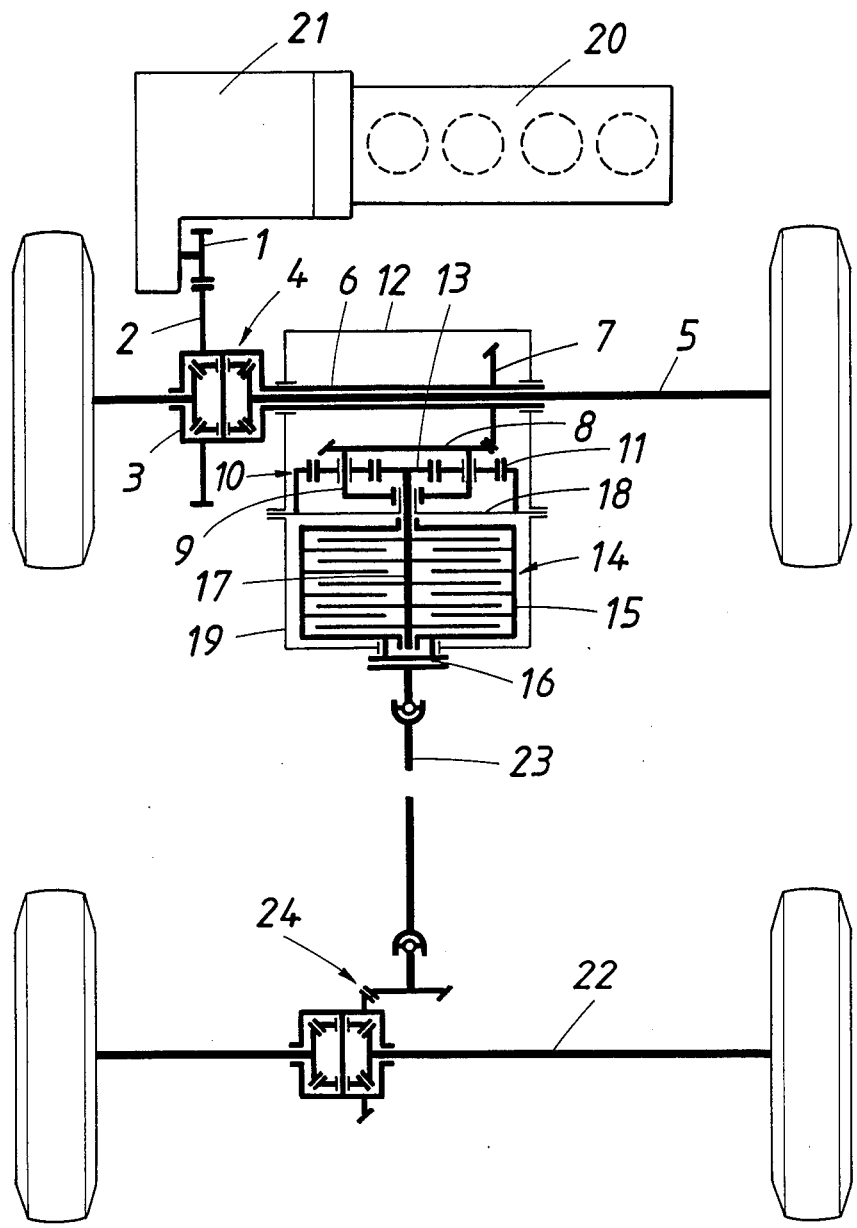
FIG. 2 is a schematic view of an otherwise conventional drivetrain incorporating the driving mechanism of FIG. 1.

The engine 20 of the vehicle has an output shaft which is transverse to the direction of travel of the vehicle, indicated by an arrow. The shafts of the change-speed transmission 21 are parallel to the output shaft of the engine; i.e., they extend also transversely to the direction of travel. The change-speed transmission 21 has output pinion 1, which is in mesh with a spur gear 2. The gears 1 and 2 constitute a spur gear train. The spur gear 2 is secured to a housing 3, which contains the differential 4 of the first live axle 5. A tubular shaft 6 is also non-rotatably connected to the differential housing 3 and is non-rotatably connected to the driving bevel gear 7 of a first angle drive, which includes a driven bevel gear 8, directly secured to the planet carrier 9 of a planetary gear train generally designated 10. The internal gear 11 of the planetary gear train 10 is non-rotatably connected to a common housing 12, which accommodates the angle drive 7, 8 and the planetary gear train 10. Power for driving the second live axle 22 is taken from the sun gear 13 of the planetary gear train 10.

The planetary gear train 10 is succeeded by a viscous clutch, which is generally designated 14 and comprises inner clutch housing 15, which carries one set of coupling discs and is rotatably mounted at one end in the planet carrier 9 of the planetary gear train 10 whereas the inner clutch housing 15 comprises at the other end a flange 16 adapted to be connected to the universal-joint shaft 23. That universal-joint shaft drives via a second angle drive 24 the second live axle. The second set of coupling discs of the viscous clutch 14 are carried by an inner clutch member 17, which is non-rotatably connected to the shaft of the sun gear 13. The common housing 12 which accommodates the first angle drive 7, 8 and the planetary gear train 10 comprises a cover 18, which constitutes a partition closing the adjacent open end of an outer clutch housing 19, which accomodates the viscous clutch 14. The planet carrier 9 of the planetary gear train 10 is rotatably mounted in that cover 18.

Torque is transmitted to first live axle 5 from the spur gear train 1, 2 via the differential 4. Torque is transmitted to the second live axle via the tubular shaft 6, the first angle drive 7, 8, the planetary gear train 9, the viscous clutch 14, the universal joint shaft 23 and the second angle drive 24. The bevel gear 8 drives the planet carrier 9. The internal gear 11 of the planetary gear train 10 is fixed, and torque is transmitted from the sun gear 13 to the inner clutch member 17 of the viscous inner clutch 14. The clutch housing 15 of that clutch carries the second set of coupling discs and by means of the flange 16 drives the universal-joint shaft 23 which is connected to the second live axle 22.

I claim:

1. A driving mechanism for a motor vehicle, which driving mechanism comprises
   an engine having an output shaft which extends transversely to the direction of travel of the vehicle,
   first and second live axles,
   a change-speed transmission adapted to be driven by said output shaft and having shafts which are parallel to said output shaft,
   a spur gear train operatively connected to said change-speed transmission,
   first torque-transmitting means for transmitting torque from said spur gear train to said first live axle, and
   second torque-transmitting means for transmitting torque from said spur gear train to said second live axle, the second torque-transmitting means comprising a first angle drive operatively connected to said spur gear train, a second angle drive operatively connected to said second live axle, the first and second angle drives having different transmission ratios, a universal-joint shaft interconnected between said first and second angle drives, and a transmission stage constituted by
   a planetary gear train disposed between said first angle drive and said universal-joint shaft.

2. The driving mechanism set forth in claim 1, wherein said first angle drive comprises a driven bevel gear,
   said planetary gear train comprises a planet carrier, an internal gear and a sun gear,
   said planetary gear train and said first angle drive are accommodated in a common gear housing,
   said planet carrier is directly secured to said driven bevel gear,
   said internal gear is non-rotatably connected to said common gear housing, and
   said sun gear is coupled to said universal-joint shaft.

3. The driving mechanism set forth in claim 1, wherein
   said planetary gear train comprises a planet carrier and a sun gear,
   said planetary gear train is coupled to said universal-joint shaft by a viscous clutch comprising an inner clutch housing, an inner clutch member extending into said inner clutch housing, a first set of coupling discs carried by said inner clutch housing, and a second set of coupling discs carried by said inner clutch member,
   said inner clutch housing is rotatably mounted in said planet carrier and coupled to said universal-joint shaft and said inner clutch member is non-rotatably connected to said sun gear.

4. The driving mechanism set forth in claim 1, wherein said planetary gear train comprises a planet carrier and is coupled to said universal-joint shaft by a viscous clutch, accommodated in an outer clutch housing, which has an open end facing said planetary gear train, and
   said planetary gear train and said first angle drive are accommodated in a common housing, which has a cover constituting a partition closing said outer clutch housing at said open end thereof, and
   said planet carrier is rotatably mounted in said cover.

5. The driving mechanism set forth in claim 1, wherein said planetary gear train is coupled to said universal-joint shaft by a viscous clutch, which comprises a clutch housing having a flange that is non-rotatably connected to said universal-joint shaft.

6. The driving mechanism set forth in claim 1, wherein said second torque-transmitting means comprises a viscous clutch for transmitting torque from said planetary gear train to said second live axle.

* * * * *